United States Patent
Andersson et al.

(10) Patent No.: US 8,397,005 B2
(45) Date of Patent: Mar. 12, 2013

(54) MASKED REGISTER WRITE METHOD AND APPARATUS

(75) Inventors: Rickard Andersson, Limhamn (SE); Karl Komierowski, Lund (SE); Ulf Morland, Åkarp (SE); Per-Inge Tallberg, Lund (SE)

(73) Assignee: St-Ericsson SA, Plan-les-Quates (CH)

( * ) Notice: Subject to any disclaimer, the term of this patent is extended or adjusted under 35 U.S.C. 154(b) by 122 days.

(21) Appl. No.: 12/724,932

(22) Filed: Mar. 16, 2010

(65) Prior Publication Data

US 2011/0231587 A1    Sep. 22, 2011

(51) Int. Cl.
*G06F 12/02* (2006.01)

(52) U.S. Cl. .......... 710/107; 710/110

(58) Field of Classification Search .......... 710/200, 710/104–110, 52–57; 711/3, 145, 155, 100, 711/202; 714/710, 30
See application file for complete search history.

(56) References Cited

U.S. PATENT DOCUMENTS

| | | | |
|---|---|---|---|
| 5,267,204 A * | 11/1993 | Ashmore, Jr. .......... | 365/200 |
| 5,287,503 A | 2/1994 | Narad | |
| 5,539,696 A * | 7/1996 | Patel .......... | 365/189.16 |
| 5,867,444 A * | 2/1999 | Le et al. .......... | 365/230.06 |
| 5,996,032 A | 11/1999 | Baker | |
| 7,174,405 B1 | 2/2007 | Dumov et al. | |
| 2005/0262403 A1 | 11/2005 | Palus | |
| 2006/0218355 A1 | 9/2006 | Brabant et al. | |
| 2008/0195894 A1 | 8/2008 | Schreck et al. | |

FOREIGN PATENT DOCUMENTS

EP    0379768 A2    8/1990

* cited by examiner

*Primary Examiner* — Raymond Phan
(74) *Attorney, Agent, or Firm* — Coats & Bennett, P.L.L.C.

(57) ABSTRACT

A hardware device register is written without transferring the register content from the hardware device to a host device over an interface bus for modification. The hardware device receives an address identifying the target register included in the hardware device and bit information associated with a write operation involving the target register from the host device over the interface bus. The address is stored in a first register included in the hardware device and dedicated for supporting write operations. The bit information is stored in a second register included in the hardware device and also dedicated for supporting write operations. The target register is accessed based on the address stored in the first register dedicated for supporting write operations and one or more bits of the target register are written based on the bit information without first transferring the register content to the host device over the interface bus.

26 Claims, 10 Drawing Sheets

MASKED REGISTER WRITE METHOD AND APPARATUS

TECHNICAL FIELD

The present invention generally relates to modifying the content of a register included in a hardware device, and more particularly relates to masked write operations.

BACKGROUND

The content of a register included in a hardware device is typically modified by a software-implemented read-modify-write operation. First, the content of the hardware device register is read out and transferred over an interface bus from the hardware device to memory such as RAM (random access memory) included in an external host. The register content is modified in the memory, for example by setting a bit that activates a certain hardware feature such as turning on a backlight. The bit is typically set with a logic OR operation to avoid changing other bits of the register content. If the bit were instead being cleared, a logic AND operation would be used. After the register content has been changed, the modified content is read out of the memory, transferred from the host device to the hardware device over the interface bus. The target register is then written with the modified content. If the bus used to transfer the register content back and forth between the hardware device and memory is relatively slow, the read-modify-write operation causes bottlenecks for other concurrent operations carried out over the bus. For example, software processes on the same master host or on different hosts may contend for access to the same register data. Also, software processes on the same master host or on different hosts modifying different bits of the same register must perform read-modify-write operations atomically to avoid errors.

SUMMARY

According to the methods and apparatus described herein, a set of registers included in a hardware device are dedicated for supporting write operations, obviating the need to transfer register content out of the hardware device over an interface bus to an external device such as memory for modification of the content. Instead, some or all of the register content can be modified locally within the hardware device using the set of dedicated registers to facilitate the write operation. The set of dedicated registers is used to support write operations only, including setting, clearing and overwriting one or more bits of a target register.

According to one embodiment of a method for performing a write operation at a hardware device coupled to a host device over an interface bus, the method includes receiving an address identifying a target register included in the hardware device and bit information associated with a write operation involving the target register from the host device over the interface bus. The address is stored in a first register included in the hardware device and dedicated for supporting write operations. The bit information is stored in a second register included in the hardware device and dedicated for supporting write operations. The target register is accessed based on the address stored in the first register dedicated for supporting write operations and one or more bits of the target register are written based on the bit information without first transferring content of the target register to the host device over the interface bus.

According to one embodiment of a hardware device, the hardware device includes a target register operable to store content, a first register dedicated for supporting write operations and operable to store an address identifying the target register received from a host device coupled to the hardware device over an interface bus, and a second register dedicated for supporting write operations and operable to store bit information associated with a write operation involving the target register received from the host device over the interface bus. The hardware device further includes circuitry operable to access the target register based on the address stored in the first register dedicated for supporting write operations and write one or more bits of the target register based on the bit information without first transferring the content of the target register to the host device over the interface bus.

According to another embodiment of a method for performing a write operation at a hardware device coupled to a plurality of host devices, the method includes receiving an address identifying a target register included in the hardware device and bit information associated with a write operation involving the target register from a first one of the plurality of host devices over an interface bus. The address is stored in a first register included in the hardware device and dedicated for supporting write operations. The bit information is stored in a second register included in the hardware device and dedicated for supporting write operations. The target register is accessed based on the address stored in the first register dedicated for supporting write operations and one or more bits of the target register are written based on the bit information without first transferring content of the target register to the first host device over the interface bus.

According to another embodiment of a hardware device, the hardware device includes a target register operable to store content, a first register dedicated for supporting write operations and operable to store an address identifying the target register received from a first one of a plurality of host devices coupled to the hardware device over an interface bus, and a second register dedicated for supporting write operations and operable to store bit information associated with a write operation involving the target register received from the first host device over the interface bus. The hardware device further includes circuitry operable to access the target register based on the address stored in the first register dedicated for supporting write operations and write one or more bits of the target register based on the bit information without first transferring the content of the target register to the first host device over the interface bus.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
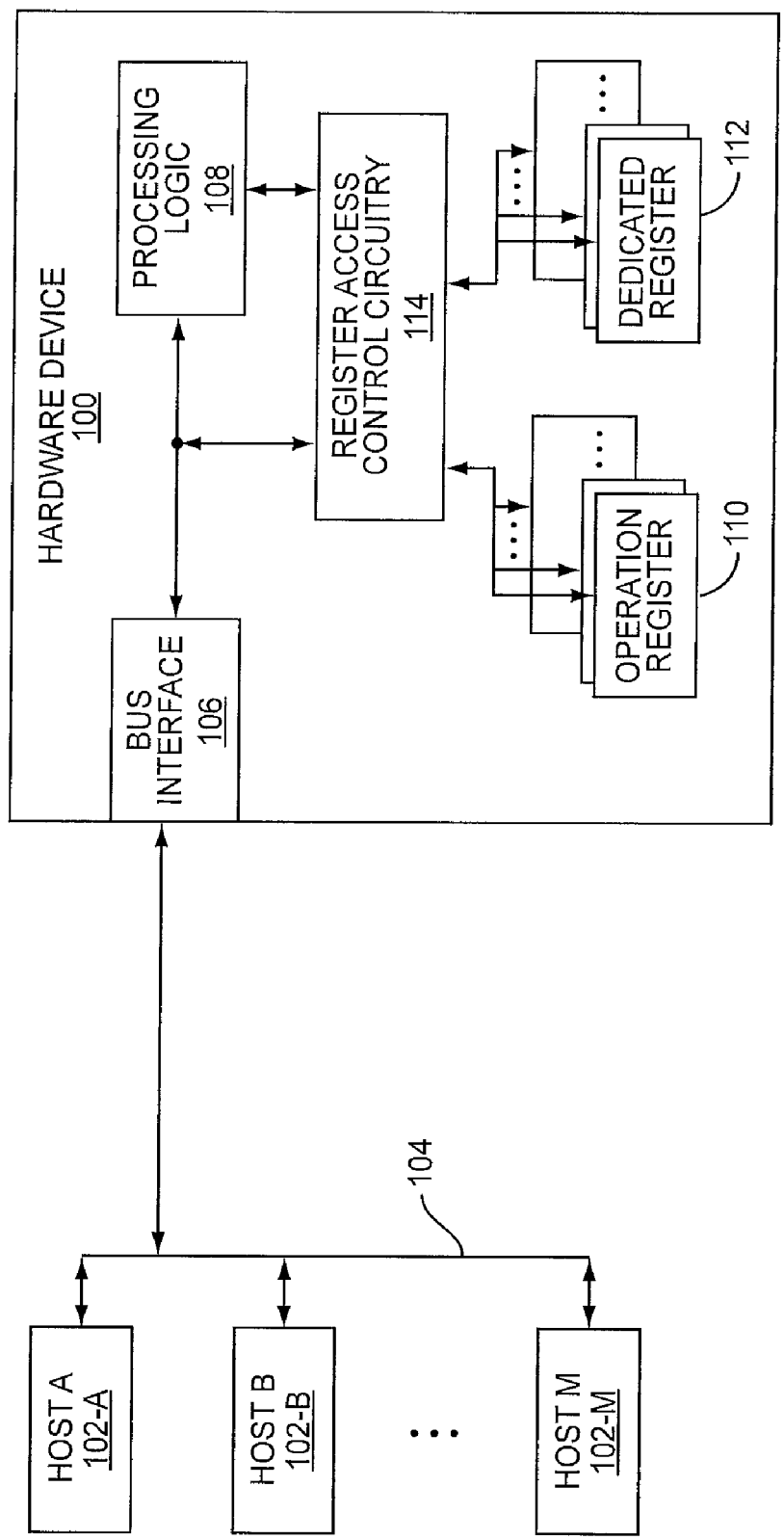
FIG. 1 illustrates a block diagram of an embodiment of a hardware device coupled to a plurality of host devices over a shared interface bus.

FIG. 1 illustrates an embodiment of a hardware device 100 coupled to a plurality of host devices 102 over a shared interface bus 104. Some or all of the host devices 102 shown in FIG. 1 may correspond to a physical device with a bus interface for coupling to the hardware device 100. Some or all of the host devices 102 shown in FIG. 1 may correspond to a plurality of logical hosts included in a particular host physical device such as software processes which access the hardware device 100 on occasion. Each software process is treated as a different host device 102 from the perspective of the hardware device 100. In each case, the hardware device 100 handles each physical device coupled to the hardware device 100 or individual software processes running on a particular host physical device as a separate host device 102.

The hardware device 100 includes bus interface circuitry 106 for connecting to the interface bus 104. The hardware device 100 and the host devices 102 form a computing system. The hardware device 100 can be any type of peripheral or support device forming part of the overall system. For example, the hardware device 100 can be an input device, output device, display device, graphical output device, computer display, network interface card, controller, expansion card, accelerator, USB (universal serial bus) device, etc. Each host device 102 also forms part of the overall system architecture, and may include any type of processing device such as a processor, CPU (central processing unit), digital signal processor, network processor, ASIC (application-specific integrated circuit), etc. A plurality of software processes may be on each host device 102 and attempt to access the hardware device 100, and each software process is treated as a different host device from the perspective of the hardware device 100 as described above. The hardware device 100 further includes processing logic 108 for enhancing the capabilities of the host devices 102. The processing logic 108 implements the functions supported by the hardware device 100. The hardware device 100 also includes a first set of registers 110 and second set of registers 112 for storing information and which are accessed from time-to-time by the host devices 102 over the common interface bus 104 so that content stored in the first set of registers 110 can be modified.

The first set of hardware device registers 110 store content related to the functions supported by the hardware device 100 and are referred to herein as operation registers. The second set of registers 112 are dedicated for supporting write operations and store information used to implement a write operation without having to first transfer the content of the target operation register 110 from the hardware device 100 to the initiating host device 102 over the interface bus 104. These registers 112 are referred to herein as dedicated registers. Each dedicated register 112 can be implemented as a single physical register or a plurality (i.e. two or more) of physical registers. For example, a dedicated register 112 used for storing an address of an operation register 110 or a bit mask can be implemented as two separate physical registers to improve optimization. A write over the interface bus 104 can manage implicit address increment when writing multiple data. This way, a plurality of the dedicated registers 112 used to implement the write operation can be written via a single write command over the interface bus 104, the single command including the address of the target operation register 110 and a corresponding bit mask.

The hardware device 100 includes access control circuitry 114 for controlling access to the operation registers 110 and the dedicated registers 112. To initiate a write operation, one to the host devices 102 writes the address of the target operation register 110 into one of the dedicated registers 112 of the hardware device 100 and writes corresponding bit information into a different on of the dedicated registers 112 over the shared interface bus 104. In one embodiment, the bit information is a bit mask for clearing one or more bits of the target operation register 110. In another embodiment, the bit information is a bit mask for setting one or more bits of the target operation register 110. In yet another embodiment, the bit information includes a bit mask and bit data for writing a subset of the target register bits. According to this embodiment, the address of the target operation register 110 is written into a first one of the dedicated registers 112 of the hardware device 100, the bit mask is written into a second one of the dedicated registers 112 and the bit data is written into a third one of the dedicated registers 112. In each case, the register access control circuitry 114 writes one or more bits of the target operation register 110 based on the information stored in the dedicated registers 112 without first transferring content of the target register 110 to the host device 102 over the interface bus 104.

In more detail, the hardware device 100 receives an address identifying one of the operation registers 110 included in the hardware device 100 and bit information associated with a write operation involving the target operation register 110 from one of the host devices 102 over the interface bus 104. The address is written into a first one of the registers 112 dedicated for supporting write operations and the bit information is written into a second one of the registers 112 dedicated for supporting write operations. In response, the register access control circuitry 114 accesses the target operation register 110 based on the address stored in the first dedicated register 112 and writes one or more bits of the target operation register 110 based on the bit information stored in the second dedicated register 112 without first transferring the content of the target operation register 110 to the initiating host device 102 over the interface bus 104.

Figure 2:
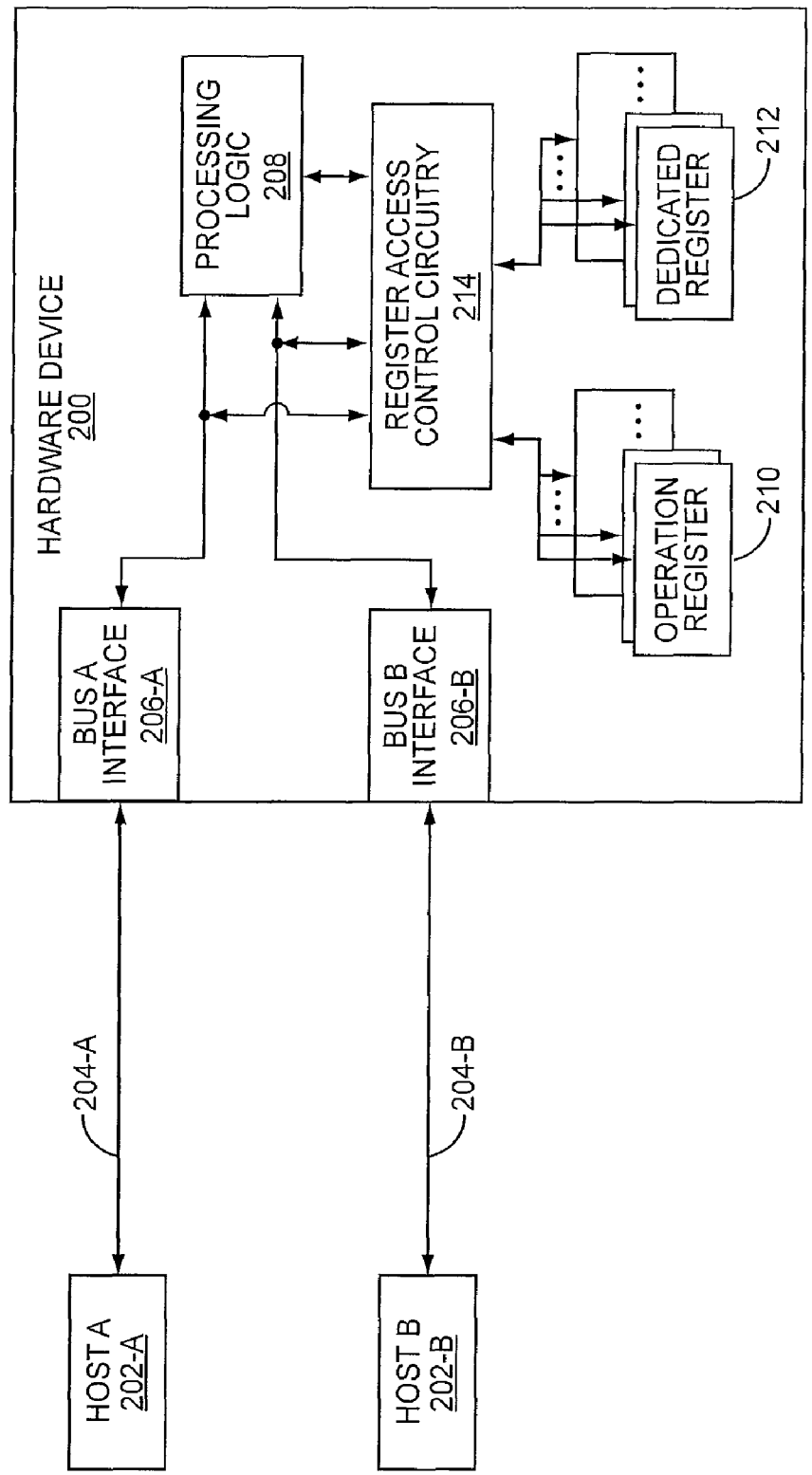
FIG. 2 illustrates a block diagram of another embodiment of a hardware device coupled to a plurality of host devices over respective dedicated buses.

FIG. 2 illustrates another embodiment of a hardware device 200 coupled to a plurality of host devices 202 over respective interface buses 204. Some or all of the host devices 202 shown in FIG. 2 may correspond to a physical device with a bus interface for coupling to the hardware device 200. Some or all of the host devices 202 shown in FIG. 2 may correspond to a plurality of logical hosts included in a particular host physical device such as software processes which access the hardware device 200 on occasion. Each software process is treated as a different host device 202 from the perspective of the hardware device 200. In each case, the hardware device 200 handles each physical device coupled to the hardware device 200 or individual software processes running on a particular host physical device as a separate host device 202.

The hardware device 200 is connected to each interface bus 204 through respective bus interface circuitry 206. In one embodiment, the interface buses 204 are I2C buses. In general, any type of suitable interface bus technology may be used. A plurality of software processes may be on each host device 202 and attempt to access the hardware device 200, and each software process is treated as a different host device from the perspective of the hardware device 200 as described above. The hardware device 200 further includes processing logic 208 for enhancing the capabilities of the host devices 202 by implementing the functions supported by the hardware device 200. Operation registers 210 of the hardware device 200 store content related to the functions supported by the hardware device 200 and dedicated registers 212 are provided for supporting write operations and are loaded with information used to implement a write operation without having to first transfer the content of the target operation register 210 from the hardware device 200 to the initiating host device 202 over the interface bus 204 as explained above.

The system embodiments shown in FIGS. 1 and 2 may be system-on-chip architectures where the hardware device 100/200 and host devices 102/202 are fabricated on the same die and coupled together via one or more internal buses 104/204. Alternatively, the host devices 102/202 and corresponding interface buses 104/204 are provided on different chips or boards, and are thus external to the hardware device 100/200. In each case, content stored in the operation registers 110/210 of the hardware device 100/200 can be modified without having to transfer the register content to the initiating host device 102/202 over the respective interface bus 104/204 for modification.

Figure 3:
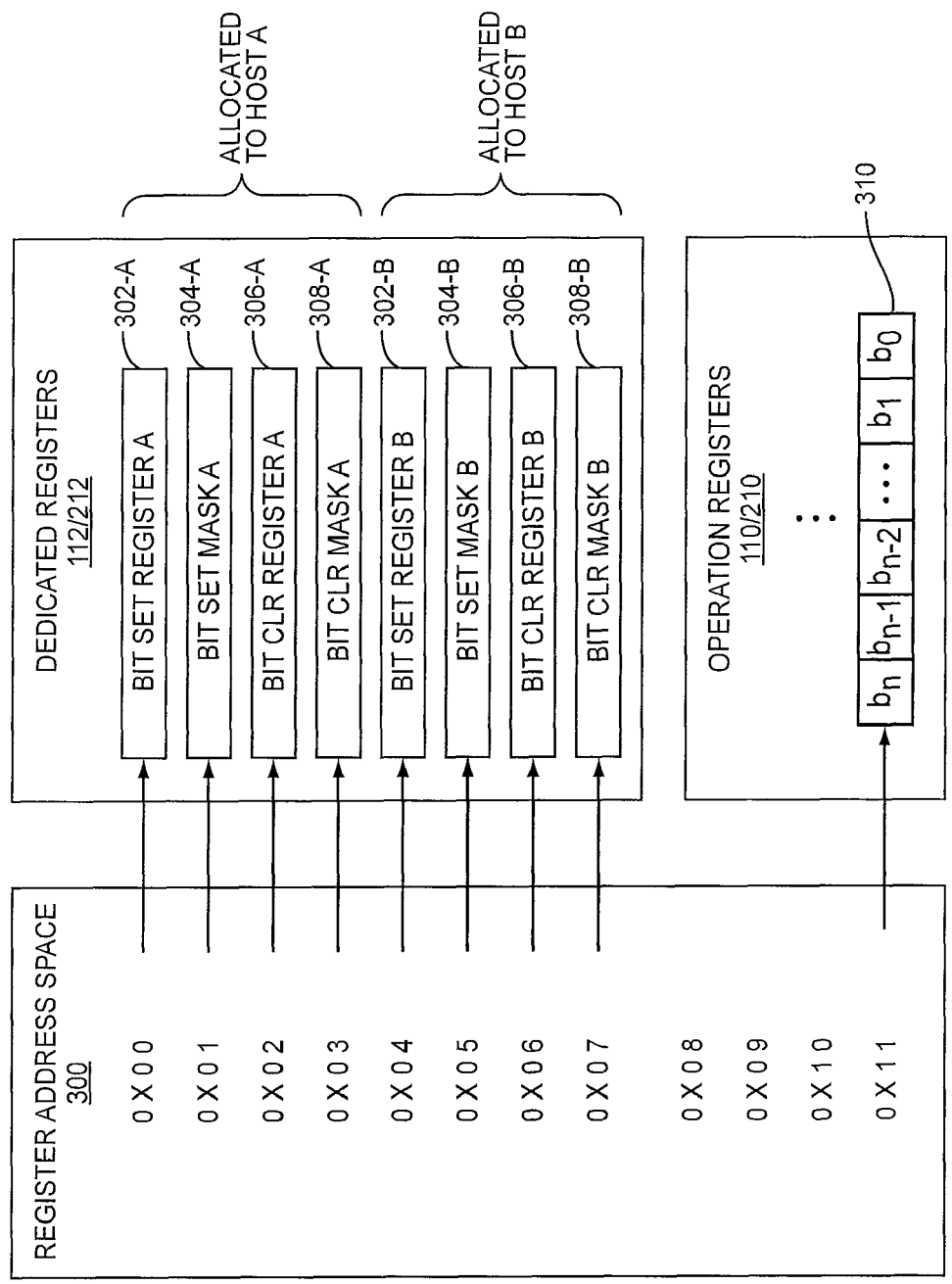
FIG. 3 illustrates an embodiment of address space mapping for a first set of registers included in a hardware device which are dedicated for supporting write operations and a second set of registers which support functions of the hardware device.

FIG. 3 illustrates an embodiment of address space mapping maintained by the register access control circuitry 114/214 for the operation registers 110/210 and the dedicated registers 112/212 included in the hardware device 100/200. Twelve registers are shown in FIG. 3 for ease of illustration only, with eight registers being allocated as dedicated registers 112/212 and four registers being allocated as operation registers 110/210. Broadly, the hardware device 100/200 may include any desirable number of operation registers 110/210 and dedicated registers 112/212. With this understanding, the first four addresses (0x00, 0x01, 0x02 and 0x03) of the register address space 300 shown in FIG. 3 identify a first group of four dedicated registers 112/212 allocated to a first one of the hosts (host A). The next four addresses (0x04, 0x05, 0x06 and 0x07) of the register address space 300 identify a different group of four dedicated registers 112/212 allocated to a second one of the hosts (host B). The last four addresses (0x08, 0x09, 0x10 and 0x11) of the register address space 300 identify four operation registers 110/210 available for modification by either host device A or host device B.

According to this embodiment, the first dedicated register 302 allocated to each host device is for storing the address of a target operation register 110/210 having one or more bits (b) to be set during a set operation. The second dedicated register 304 allocated to each host device is for storing a corresponding bit mask of the set operation. The third dedicated register 306 allocated to each host device is for storing the address of a target operation register 110 having one or more bits to be cleared during a clear operation. The fourth dedicated register 308 allocated to each host device is for storing a corresponding bit mask of the clear operation. The second and/or fourth dedicated registers 304/308 may hold an actual bit mask or a bit number rather. In addition, one of the dedicated registers 112/212 allocated to each host device may be a command register for instructing the register access control circuitry 114/214 to clear or set bits according to the corresponding dedicated mask register 304/308 and the corresponding dedicated target address register 302/306. Each of the dedicated registers 302-308 can be implemented as a single physical register or a plurality of physical registers as explained above.

Figure 4:
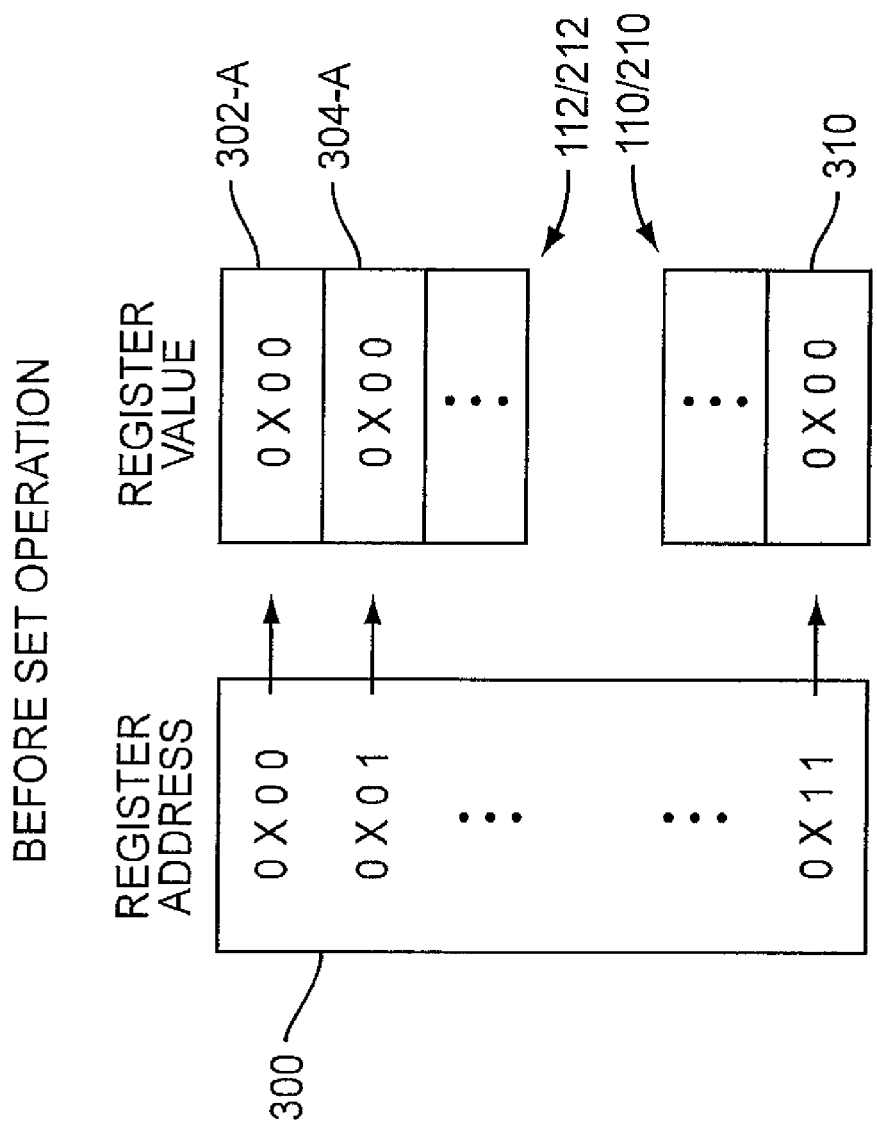
FIGS. 4-6 illustrate content of the registers shown in FIG. 3 during different stages of a set operation.
Figure 5:
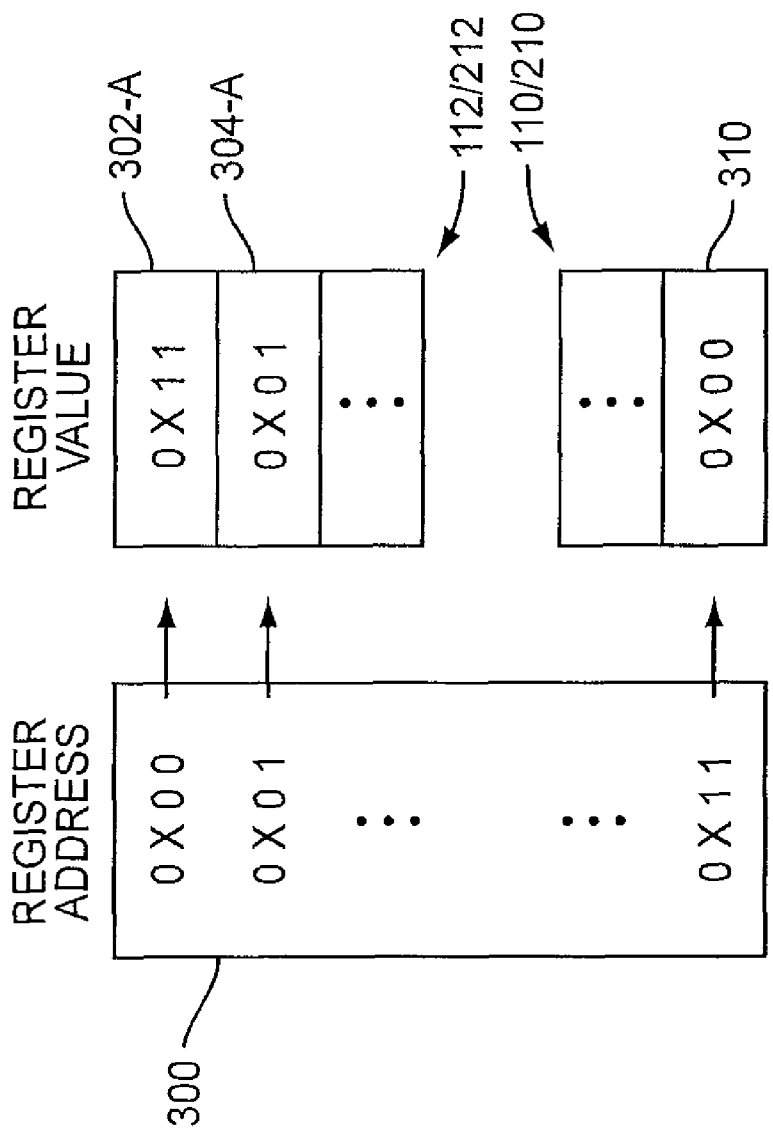
Figure 6:
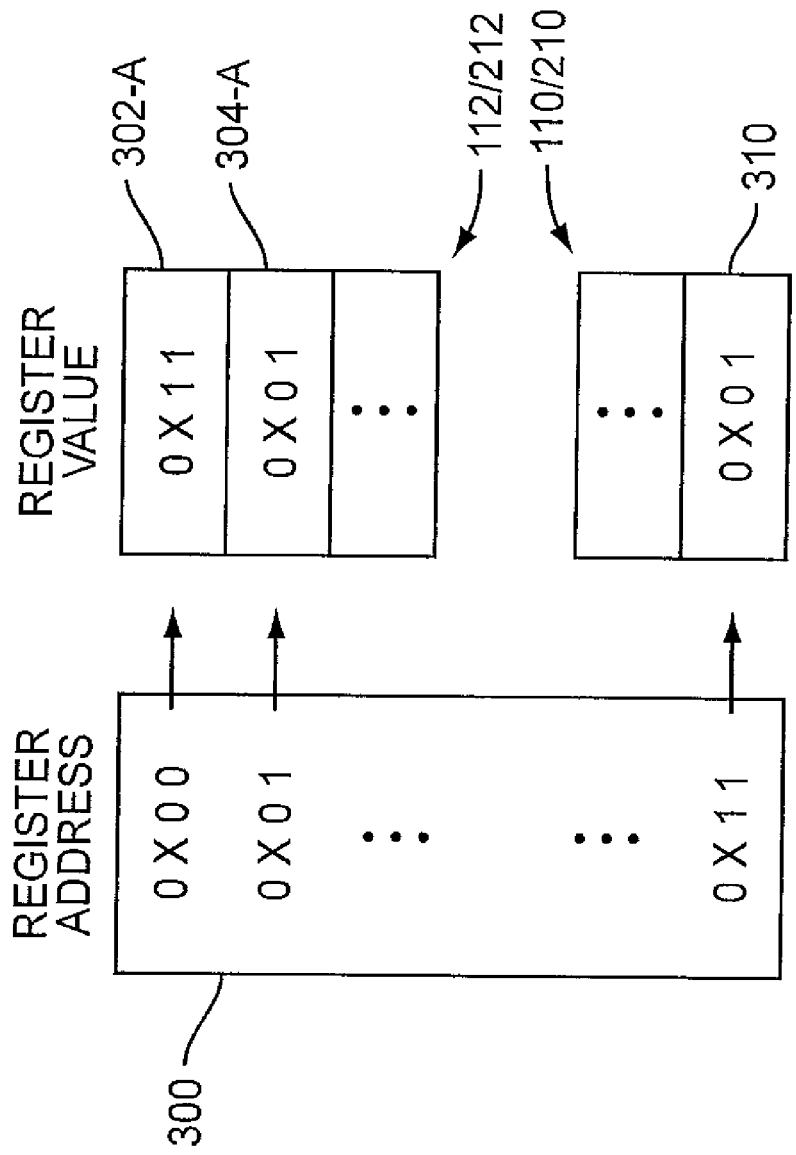

FIGS. 4-6 illustrate how one or more bits of operation register 310 identified by address 0x11 can be set by host device A. Prior to the set operation, FIG. 4 shows the dedicated registers 112 and the operation registers 110 in respective default states (e.g. all logic zeros). Host device A then writes address 0x11 into the first dedicated register 302 allocated to host device A and writes the bit mask (0x01) for the set operation into the second dedicated register 304 allocated to host device A. Host device A uses the corresponding interface bus 104/204 to write the target operation register address (0x11) and bit mask (0x01) into the corresponding dedicated registers 302, 304 of the hardware device 100/200.

FIG. 5 shows the status of the affected operation registers 110 and the affected dedicated registers 112 after host device A writes the first and second dedicated registers 302, 304 allocated to host device A. Dedicated registers 0x00 and 0x01 have been written by host device A over the corresponding bus 104/204, triggering the register access control circuitry 114/214 to perform a write operation on operation register 0x11 since address 0x11 is stored in dedicated register 0x00. In response to the dedicated registers 302, 304 being written by the host device 102/202 to indicate a set operation, the register access control circuitry 114/214 sets one or more bits of target operation register 0x11 based on the bit mask (0x01) stored in dedicated register 0x01.

FIG. 6 shows the status of the affected operation registers 110 and the affected dedicated registers 112 after the set operation is performed. During a set operation, each bit to be set is written as a logic one value. According to the purely exemplary embodiment described above, the register access control circuitry 114/214 sets bit '0' of the target operation register 0x11 to a logic one value as shown in FIG. 6. Bit 'b0' of operation register 310 controls some function of the hardware device 100/200, e.g. a backlight feature of the hardware device 100/200. Of course, more than one bit may be set and the function associated with each bit being set depends on the particular application in which the hardware device 100/200 is used.

The exemplary embodiment described above relates to set operations. A clear operation involves resetting one or more bits of an operation register 110 to a certain state (e.g. logic zero) and can be similarly implemented by writing the appropriate target operation register address and bit mask information into the corresponding dedicated registers 112 allocated to the host device 102/202 initiating the clear operation. In response, the register access control circuitry 114/214 clears each unmasked bit of the target operation register 110, the address of the target operation register 110 being stored in the third dedicated register 306 and the bit mask being stored in the fourth dedicated register 308 allocated to the host device 102/202 that initiated the write operation as described above. Either the logic high bits or the logic low bits in the dedicated mask register 308 can determine which bits of the target operation register 110 are cleared (or set for a set operation). The register access control circuitry 114/214 performs a clear operation instead of a set operation since the third dedicated register 306 is written with the target operation register address instead of the first dedicated register 302 which is allocated for set operations.

Figure 7:
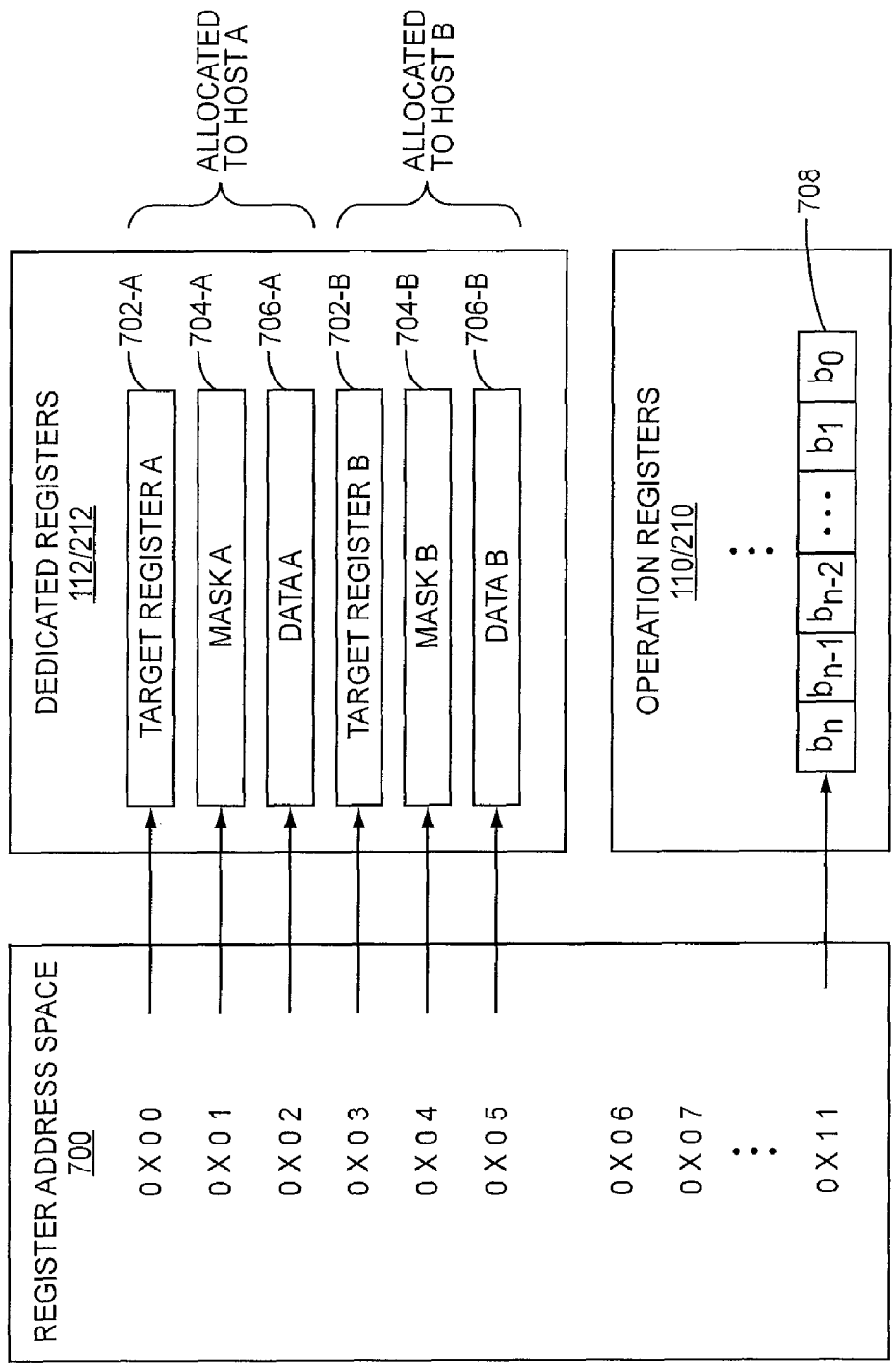
FIG. 7 illustrates another embodiment of address space mapping for a first set of registers included in a hardware device which are dedicated for supporting write operations and a second set of registers which support functions of the hardware device.

FIG. 7 illustrates another embodiment of address space mapping maintained by the register access control circuitry 114/214 for the operation registers 110/210 and the dedicated registers 112/212 included in the hardware device 100/200. Twelve registers are shown in FIG. 7 for ease of illustration only, with six dedicated registers 112/212 allocated to host devices A and B and six operation registers 110/210. Broadly, the hardware device 100/200 may include any desirable number of operation registers 110/210 and dedicated registers 112/212. With this understanding, the first three addresses (0x00, 0x01 and 0x02) of the register address space 700 identify a first group of three dedicated registers 112/212 allocated to host device A. The next three addresses (0x03, 0x04 and 0x05) of the register address space 700 identify a different group of three dedicated registers 112/212 allocated to host device B. The last six addresses (0x06, 0x07, 0x08, 0x09, 0x10 and 0x11) of the register address space 700 identify six operation registers 110/210 available for modification by either host device A or host device B.

According to this embodiment, the first dedicated register 702 allocated to each host device 102/202 is for storing the address of a target operation register 110/210 having one or more bits (b) to be written during a write operation. The second dedicated register 704 allocated to each host device 102/202 is for storing a bit mask of the write operation. The bit mask indicates which bit(s) of the target operation register 110/210 are to be written and which bit(s) should remain unchanged. The third dedicated register 706 allocated to each host device 102/202 is for storing the actual data to be written into the target operation register 110/210 during the write operation. Each of the dedicated registers 702-706 can be implemented as a single physical register or a plurality of physical registers as explained above.

Figure 8:
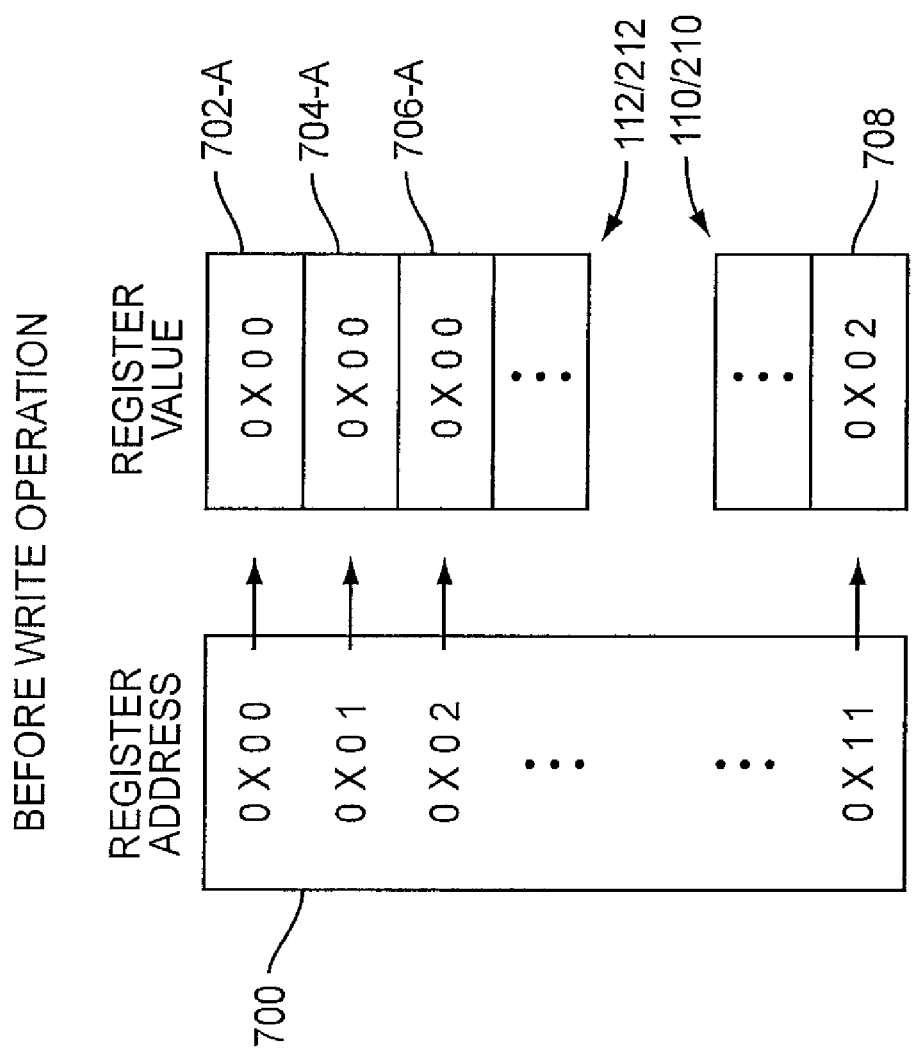
FIGS. 8-10 illustrate content of the registers shown in FIG. 7 during different stages of a masked write operation.
Figure 9:
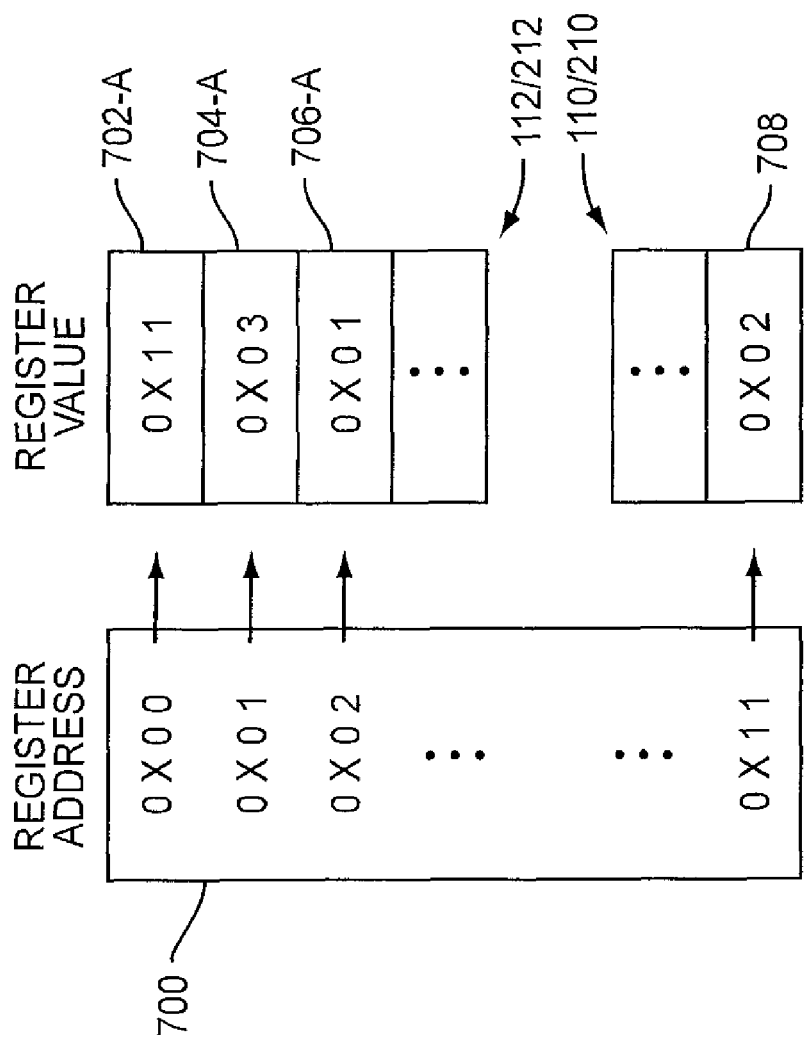
Figure 10:
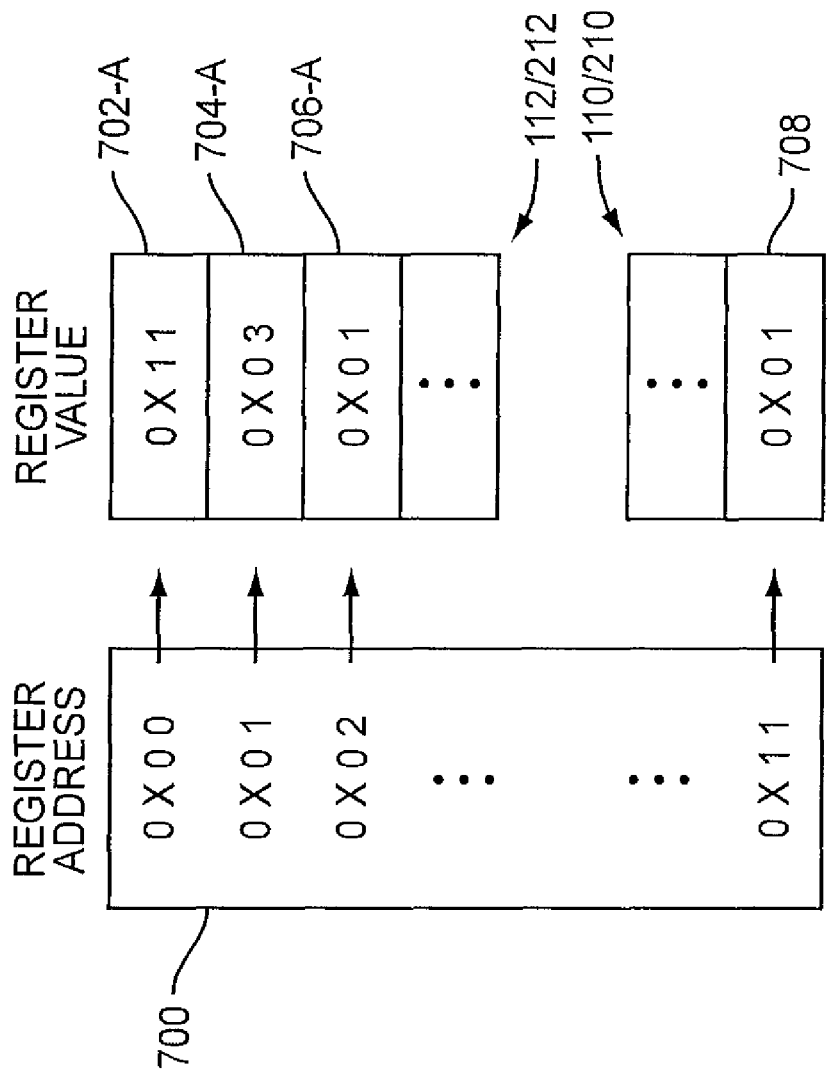

FIGS. 8-10 illustrate how one or more bits of the operation register 708 identified by address 0x11 can be written by host device A. Prior to the write operation, FIG. 8 shows the dedicated registers 112/212 in respective default states (e.g. all logic zeros) and the target operation register 708 storing a particular bit pattern (0x02). For example, the second last bit (b1) of the target operation register 708 may control a vibrator feature of the hardware device 100/200 and the last bit (b0) of the target operation register 708 may control a backlight feature of the hardware device 100/200. FIG. 8 shows value 0x02 being stored in the target operation register 708 prior to the write operation, meaning that the vibrator is turned on and the backlight turned off. Host device A causes the vibrator to be turned off and the backlight turned on by writing address 0x11 into the first dedicated register 702 allocated to host device A, bit mask 0x03 into the second dedicated register 704 allocated to host device A and bit data 0x01 into the third dedicated register 706 allocated to host device A. Host device A uses the corresponding interface bus 104/204 to write the target operation register address (0x11), bit mask (0x03) and bit data (0x01) into the corresponding dedicated registers 112/212 of the hardware device 100/200.

FIG. 9 shows the status of the affected operation registers 110/210 and the affected dedicated registers 112/212 after host device A writes the first, second and third dedicated registers 702, 704, 706 allocated to host device A. The dedicated registers 112/212 identified by addresses 0x00, 0x01 and 0x02 have been written by host device A over the corresponding bus 104/204, causing the register access control circuitry 114/214 to perform a write operation on target operation register 708 since address 0x11 is stored in the first dedicated register 702 allocated to host device A. The register access control circuitry 114/214 uses the bit mask 0x03 stored in the second dedicated register 704 allocated to host device A and identified by address 0x01 to determine that bits b1 and b0 of target operation register 708 are to be written. All other bits of the target operation register 708 should remain unchanged. Bits b0 and b1 of the target operation register 708 are written based on the bit data 0x01 stored in third dedicated register 706 allocated to host device A and identified by address 0x02.

FIG. 10 shows the status of the affected operation registers 110/210 and the affected dedicated registers 112/212 after the write operation is performed. The register access control circuitry 114/214 writes bit data 0x01 into bits b1 and b0 of the target operation register 708 identified by address 0x11, turning off the vibrator and turning on the backlight of the hardware device 100/200. Of course, other bits of the target operation register 708 or other operation registers 110/210 can be written and the functions controlled by the state of the operation register bits can vary from application to application.

According to the embodiments described above, the register access control circuitry 114/214 included in the hardware device 100/200 can concurrently write one or more bits of an operation register 110/210 based on the information stored in the corresponding dedicated registers 112/212. That is, the register access control circuitry 114/214 can set or clear one or more bits of the operation register 110/210 without having to read the register content, modify the content and then write the modified content back to the target operation register 110/210. Alternatively, the register access control circuitry can perform a local read-modify-write operation to modify the content of an operation register 110/210. According to this embodiment, the register access control circuitry 114/214 reads the content of the target operation register 110/210 and modifies one or more bits of the content based on the bit information (e.g. set/clear mask or write mask and bit data) stored in the corresponding dedicated registers 112/212 to generate modified content. The register access control circuitry 114/214 then writes the modified content back to the target operation register 110/210 without having to first transfer the content or the modified content to the initiating host device 102/202 over the corresponding interface bus 104/204. Thus, even though the register access control circuitry 114/214 performs a read-modify-write operation to modify operation register content, the read-modify-write operation is performed locally within the hardware device 100/200 and does not consume bandwidth of the interface bus 104/204 to which the initiating host device 102/202 is coupled. For example, some of the dedicated registers 112/212 included in the hardware device 100/200 may be allocated for storing and modifying the content read out of an operation register 110/210 during a write operation or the register access control circuitry 114/214 may include storage elements for holding and modifying the register content. In the event two or more write instructions are concurrently received from two or more of the host devices 102/202 and directed to the same target operation register 110/210, the register access control circuitry 114/214 recognizes the potential conflict and successively executes the write instructions based on a predetermined order maintained at the hardware device 100/200, serializing the requests and processing them completely one after the other.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of performing a write operation at a hardware device coupled to a host device over an interface bus, the method comprising:

receiving an address identifying a target register included in the hardware device and bit information associated with a write operation involving the target register from the host device over the interface bus;

storing the address in a first register included in the hardware device and dedicated for supporting write operations;

storing the bit information in a second register, different than the first register, included in the hardware device and dedicated for supporting write operations;

accessing the target register based on the address stored in the first register dedicated for supporting write operations; and writing one or more bits of the target register based on the bit information without first transferring content of the target register to the host device over the interface bus.

2. The method of claim 1, wherein the bit information is a bit mask and one or more bits of the target register are set based on the bit mask without first transferring the content of the target register to the host device over the interface bus.

3. The method of claim 1, wherein the bit information is a bit mask and one or more bits of the target register are cleared based on the bit mask without first transferring the content of the target register to the host device over the interface bus.

4. The method of claim 1, comprising:
storing a bit mask received from the host device over the interface bus in a third register included in the hardware device and dedicated for supporting write operations; and writing one or more bits of the target register identified by the bit mask with the bit information without first transferring the content of the target register to the host device over the interface bus.

5. The method of claim 1, comprising:
reading the content of the target register;
modifying one or more bits of the content based on the bit information to generate modified content; and
writing the modified content to the target register without first transferring the content or the modified content to the host device over the interface bus.

6. A hardware device, comprising:
a target register operable to store content;
a first register dedicated for supporting write operations and operable to store an address identifying the target register received from a host device coupled to the hardware device over an interface bus;
a second register, different than the first register, dedicated for supporting write operations and operable to store bit information associated with a write operation involving the target register received from the host device over the interface bus; and
circuitry operable to access the target register based on the address stored in the first register dedicated for supporting write operations and write one or more bits of the target register based on the bit information without first transferring the content of the target register to the host device over the interface bus.

7. The hardware device of claim 6, wherein the bit information is a bit mask and the circuitry is operable to set one or more bits of the target register based on the bit mask without first transferring the content of the target register to the host device over the interface bus.

8. The hardware device of claim 6, wherein the bit information is a bit mask and the circuitry is operable to clear one or more bits of the target register based on the bit mask without first transferring the content of the target register to the host device over the interface bus.

9. The hardware device of claim 6, further comprising a third register dedicated for supporting write operations and operable to store a bit mask received from the host device over the interface bus, wherein the circuitry is operable to write one or more bits of the target register identified by the bit mask with the bit information without first transferring the content of the target register to the host device over the interface bus.

10. The hardware device of claim 6, wherein the circuitry is operable to read the content of the target register, modify one or more bits of the content based on the bit information to generate modified content, and write the modified content to the target register without first transferring the content or the modified content to the host device over the interface bus.

11. The hardware device of claim 6, wherein the host is an external host and the interface bus is an external interface bus.

12. The hardware device of claim 6, wherein at least one of the registers dedicated for supporting write operations comprises a plurality of physical registers.

13. A method of performing a write operation at a hardware device coupled to a plurality of host devices, the method comprising:
receiving an address identifying a target register included in the hardware device and bit information associated with a write operation involving the target register from a first one of the plurality of host devices over an interface bus;
storing the address in a first register included in the hardware device and dedicated for supporting write operations;
storing the bit information in a second register, different than the first register, included in the hardware device and dedicated for supporting write operations;
accessing the target register based on the address stored in the first register dedicated for supporting write operations; and
writing one or more bits of the target register based on the bit information without first transferring content of the target register to the first host device over the interface bus.

14. The method of claim 13, wherein the bit information is a bit mask and one or more bits of the target register are set based on the bit mask without first transferring the content of the target register to the first host device over the interface bus.

15. The method of claim 13, wherein the bit information is a bit mask and one or more bits of the target register are cleared based on the bit mask without first transferring the content of the target register to the first host device over the interface bus.

16. The method of claim 13, comprising:
storing a bit mask received from the first host device over the interface bus in a third register included in the hardware device and dedicated for supporting write operations; and
writing one or more bits of the target register identified by the bit mask with the bit information without first transferring the content of the target register to the first host device over the interface bus.

17. The method of claim 13, comprising:
reading the content of the target register;
modifying one or more bits of the content based on the bit information to generate modified content; and
writing the modified content to the target register without first transferring the content or the modified content to the first host device over the interface bus.

18. The method of claim 13, further comprising successively executing a plurality of write instructions concurrently received from two or more of the plurality of host devices and directed to the same target register based on a predetermined order maintained at the hardware device.

19. A hardware device, comprising:
a target register operable to store content;
a first register dedicated for supporting write operations and operable to store an address identifying the target register received from a first one of a plurality of host devices coupled to the hardware device over an interface bus;

a second register, different than the first register, dedicated for supporting write operations and operable to store bit information associated with a write operation involving the target register received from the first host device over the interface bus; and circuitry operable to access the target register based on the address stored in the first register dedicated for supporting write operations and write one or more bits of the target register based on the bit information without first transferring the content of the target register to the first host device over the interface bus.

20. The hardware device of claim 19, wherein the bit information is a bit mask and the circuitry is operable to set one or more bits of the target register based on the bit mask without first transferring the content of the target register to the first host device over the interface bus.

21. The hardware device of claim 19, wherein the bit information is a bit mask and the circuitry is operable to clear one or more bits of the target register based on the bit mask without first transferring the content of the target register to the first host device over the interface bus.

22. The hardware device of claim 19, further comprising a third register dedicated for supporting write operations and operable to store a bit mask received from the first host device over the interface bus, wherein the circuitry is operable to write one or more bits of the target register identified by the bit mask with the bit information without first transferring the content of the target register to the first host device over the interface bus.

23. The hardware device of claim 19, wherein the circuitry is operable to read the content of the target register, modify one or more bits of the content based on the bit information to generate modified content, and write the modified content to the target register without first transferring the content or the modified content to the first host device over the interface bus.

24. The hardware device of claim 19, wherein the first host is an external host and the interface bus is an external interface bus.

25. The hardware device of claim 19, wherein the circuitry is operable to successively execute a plurality of write instructions concurrently received from two or more of the plurality of host devices and directed to the same target register based on a predetermined order maintained at the hardware device.

26. The hardware device of claim 19, wherein at least one of the registers dedicated for supporting write operations comprises a plurality of physical registers.

* * * * *